Dec. 20, 1960  R. W. CRAIG  2,964,964
CONTROL MECHANISM
Filed April 10, 1959  3 Sheets-Sheet 1

INVENTOR.
Richard W. Craig
BY
Hugh R. Fisher
ATTORNEY

Dec. 20, 1960  R. W. CRAIG  2,964,964
CONTROL MECHANISM
Filed April 10, 1959  3 Sheets-Sheet 2
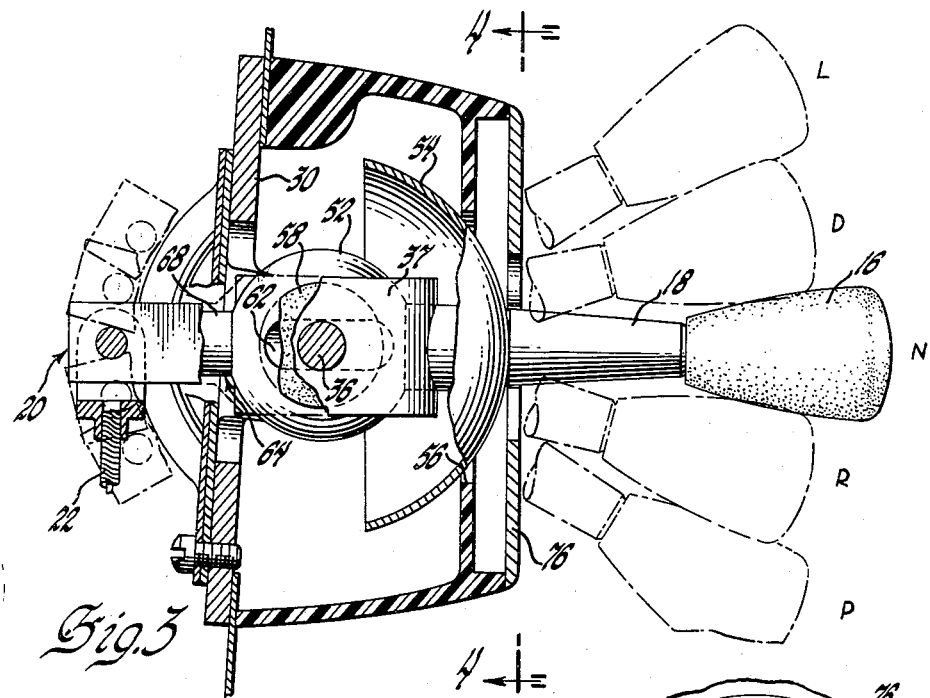
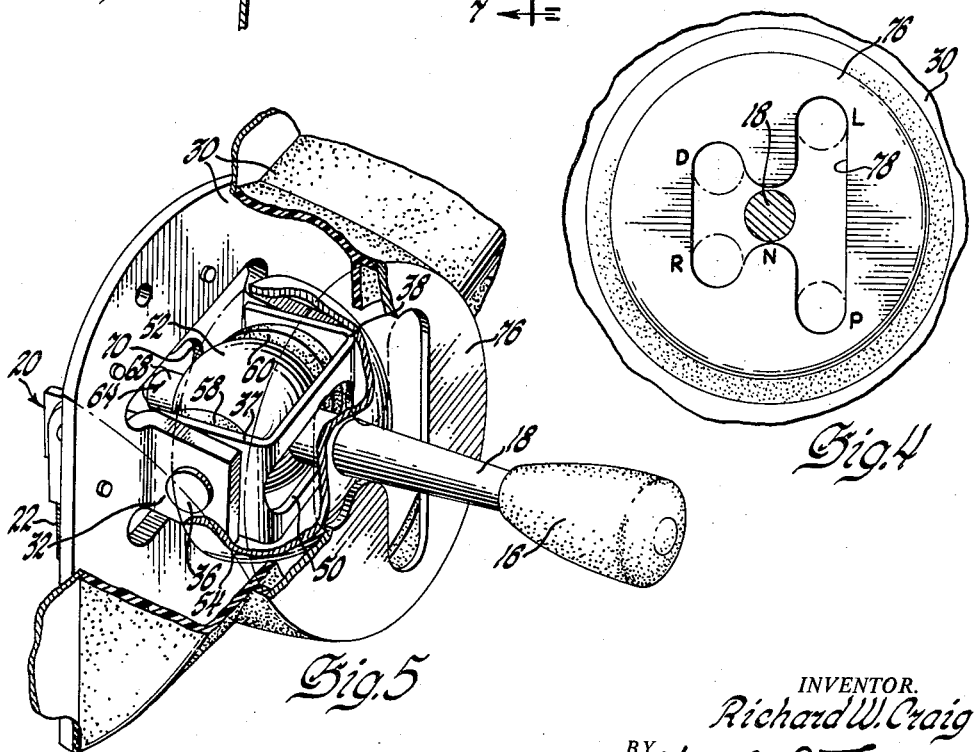
INVENTOR.
Richard W. Craig
BY Hugh L. Fisher
ATTORNEY Dec. 20, 1960  R. W. CRAIG  2,964,964
CONTROL MECHANISM
Filed April 10, 1959  3 Sheets-Sheet 3
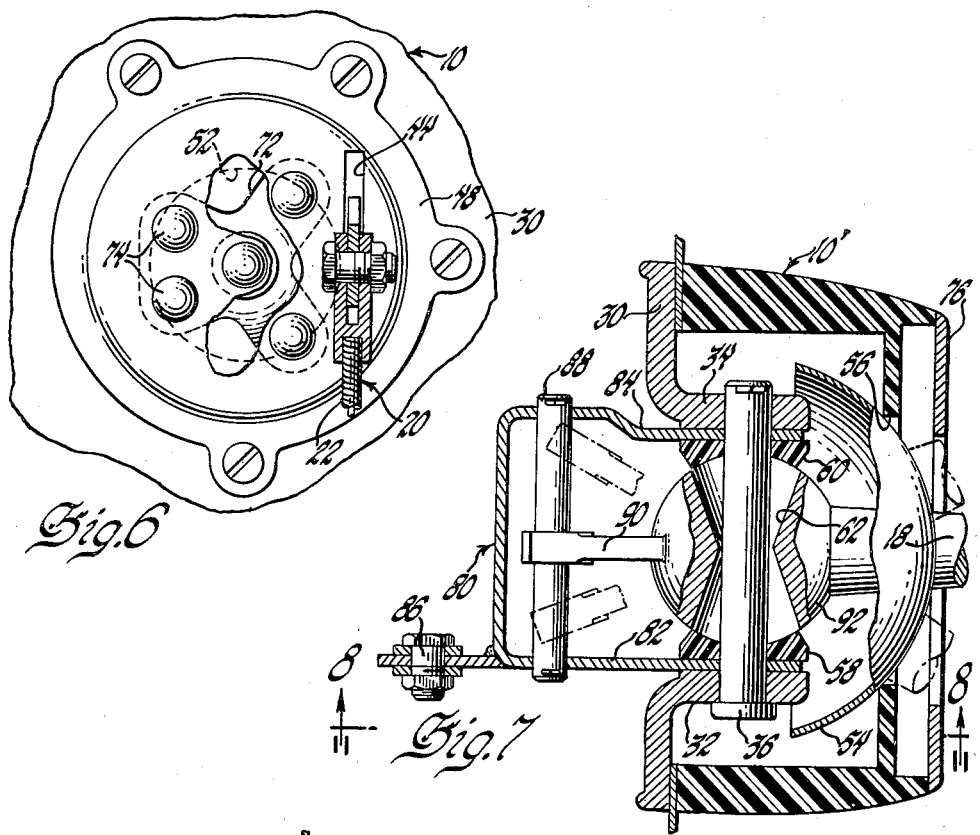
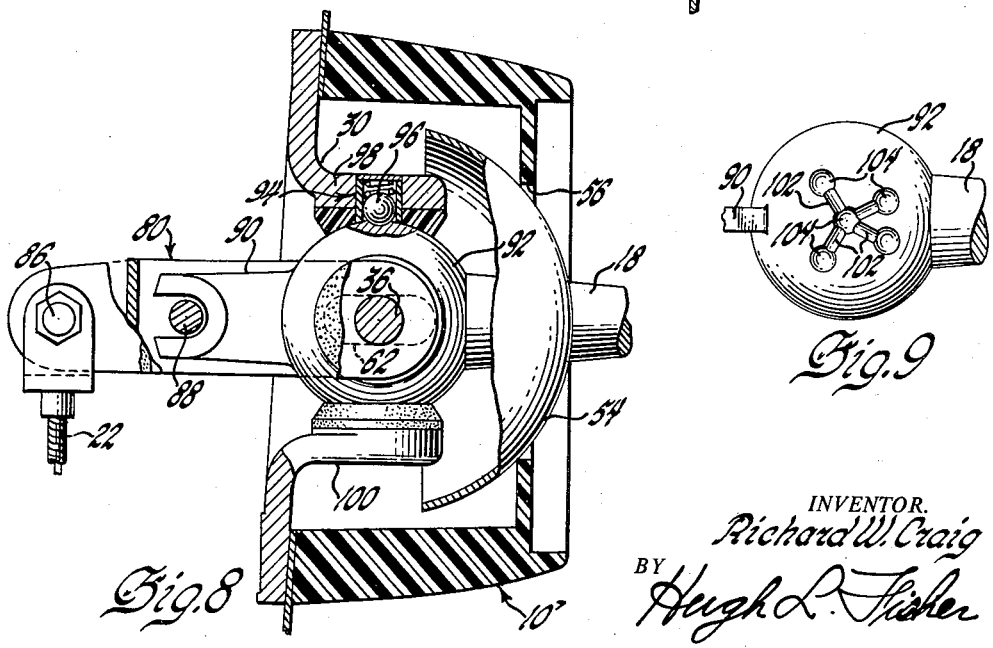
INVENTOR.
Richard W. Craig
BY Hugh L. Fisher
ATTORNEY United States Patent Office 2,964,964
Patented Dec. 20, 1960

2,964,964
CONTROL MECHANISM

Richard W. Craig, Flint, Mich., assignor to General Motors Corporation, Detroit, Mich., a corporation of Delaware Filed Apr. 10, 1959, Ser. No. 805,432

12 Claims. (Cl. 74—473)

This invention relates generally to control mechanisms, and particularly to control mechanisms adapted for use, although not exclusively, with vehicle transmissions.

Ideally, any manually operated control mechanism should be easily operated without any need for special driver education. One instance of this is in the manual controls for automatic transmissions. Any such control should preferably utilize conventional movements without any compromise in the manoeuverability requirements so that the vehicle driver does not require detailed special instructions and so that in cases of emergency the driver does not become confused by the control movements. Additionally, provision should be made so that each transmission setting is accurately sensed by the driver.

Another and related consideration concerns the positioning of the transmission control mechanism on the instrument panel rather than on the steering column, for this eliminates the need for a long metallic shift tube. However, there is then a problem of leverage, and this is further complicated by the desirability for using cables in place of multiple links and levers. To use a cable, it is preferable that the output for the mechanism only have a single type motion, i.e., rectilinear, rotary, etc.

With the foregoing in mind, the invention contemplates the provision of a control mechanism that utilizes conventional movements in multiple planes to produce a single type of output motion that is easily manoeuverable to different settings, that employs a novel detent arrangement for guiding movements of the control mechanism and for advising the operator of each setting, that is capable of affording considerable leverage for effortless operation, and that is simple structurally and easily made by accepted mass production techniques.

Another objective of the invention is to provide a control mechanism of the foregoing type that may be utilized to control a transmission through a cable, the control mechanism being so arranged as to afford adequate leverage for easy manual operation. Also, it is an aim of the invention to make provision for installing the control mechanism on a vehicle instrument panel.

In carrying out the invention, a control mechanism is provided that includes a housing with a socket receptacle for a ball end of a selector lever. The ball end of the selector lever is provided with an elongated slot therethrough that receives a shaft supported by the housing. Rotatable on this shaft is an output member in turn drive connected to the selector lever. Therefore, the selector lever can be swiveled and will cause the output member to revolve in a rotary plane of motion. To guide swivel motions of the selector lever, a detent arrangement is provided that includes a spring biased detent and a series of tracks shaped according to the desired shift pattern of the selector lever with each setting being indicated by a depression in the tracks. Consequently, the selector lever can be swiveled to each of the plurality of settings commencing at one extreme setting and terminating in another extreme setting while following a somewhat H-shaped pattern so that the output member will be revolved in one relative direction in proportionate amounts. Both the output member and the selector lever are positioned so that considerable leverage can be obtained for controlling the transmission by a cable, and moreover, the housing can be installed on the vehicle instrument panel so as to be easily accessible by the vehicle driver.

The foregoing and other objects and advantages of the invention will be apparent from the following description and from the drawings in which:

Figure 3 is a sectional view of the control mechanism taken along line 3—3 of Figure 2 showing the progressive input and output movements of the control mechanism;

Figure 4 is a fragmentary top view of the control mechanism looking in the direction of arrows 4—4 in Figure 3.

Figure 5 is a cutaway perspective view of the Figure 1 control mechanism;

Figure 6 is a fragmentary bottom view of the control mechanism looking in the direction of arrows 6—6 in Figure 2;

Figure 7 is a sectional view of a modified control mechanism;

Figure 8 is a sectional view of the modified control mechanism taken along line 8—8 of Figure 7; and Figure 9 is a plan view of the guide tracks for the modified control mechanism.

Figure 1:
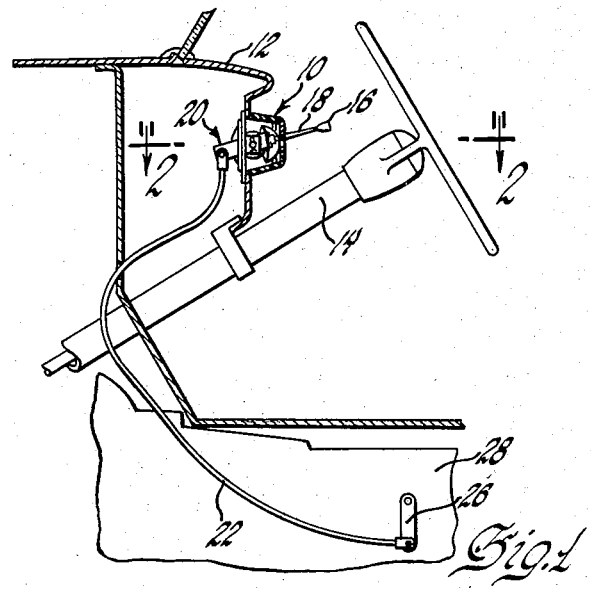
Figure 1 depicts a transmission control mechanism installed on a vehicle instrument panel for demonstrating the invention.

In the form illustrated in Figure 1, a control mechanism incorporating the principles of the invention is designated generally at 10 and is mounted on a vehicle instrument panel 12 in close proximity to a steering column 14 for accessibility to the vehicle driver. Depending on the installation and the driver's desires, the control mechanism 10 may be positioned on either side of the steering column 14 so that a selector knob 16 attached to a selector lever 18 for the control mechanism 10 may easily be manoeuvered by the left hand if on the left side of the steering column 14, or by the right hand if on the right side. Movement of the selector lever 18 in a manner to be explained, revolves an output lever 20 for the mechanism 10 and this movement of lever 20 is in turn transferred by a cable 22 to an external control lever 26 for a transmission 28.

Figure 2:
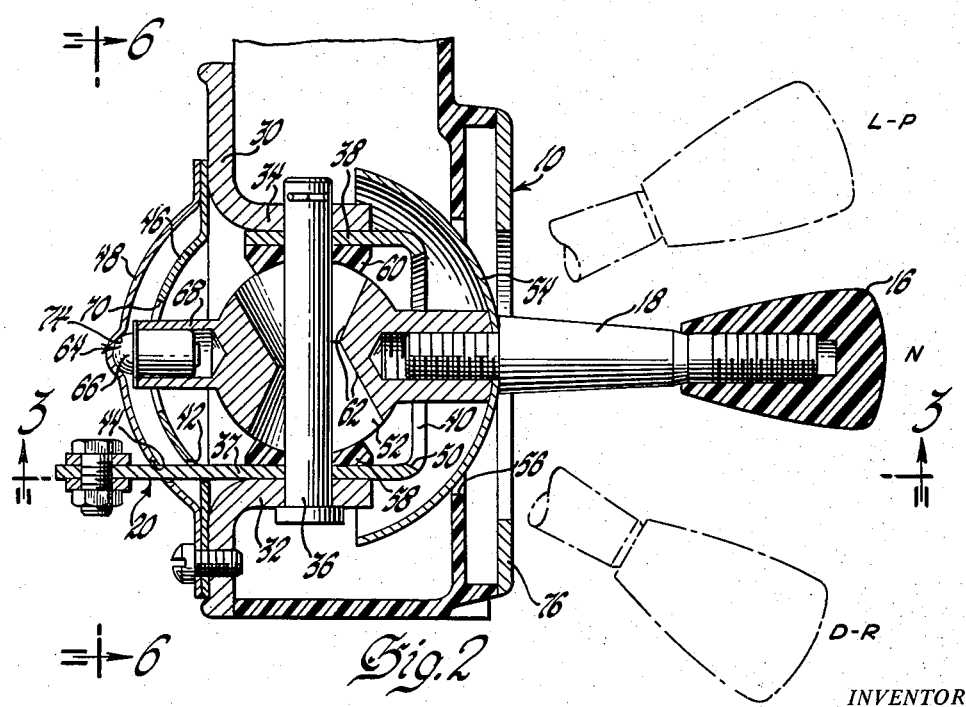
Figure 2 is a sectional view of the control mechanism taken along line 2—2 of Figure 1.

Referring to Figure 2 for the detailed components of the control mechanism 10, a housing 30 is depicted formed with spaced outwardly extending flanges 32 and 34. Supported by these flanges 32 and 34 is a shaft 36 that revolvably supports the somewhat L-shaped output lever 20. The output lever 20 comprises several sections including a long leg section 37 adjacent flange 32, a short leg section 38 adjacent flange 34, and a crossover section 40 interconnecting the long and short leg sections 37 and 38. The output lever 20 extends to the exterior of the control mechanism housing 30 through elongated slots 42 and 44 respectively in a cover 46 and a detent plate 48 secured to the instrument panel side of the housing 30, the slots 42 and 44 being best shown in Figure 6. The crossover section 40 is formed with an aperture 50 through which the selector lever 18 extends when threadedly joined to a ball end 52. At the threaded connection between the selector lever 18 and the ball end 52, a hemispherically-shaped dust shield 54 is positioned so as to coact with and form a seal-like closure with an opening 56 in the housing 30.

To revolvably support the ball end 52 of the selector lever 18 in the housing 30, guide bearings 58 and 60 are positioned on each side of the ball end surfaces and on shaft 36, respectively, adjacent to long leg 37 and short leg 38. The bearing surfaces of the guide bearings 58 and 60 conform to the spherical surface of the ball end 52 and afford relatively frictionless operation. Also, the ball end 52 is formed with an elongated slot 62 extending through the center thereof, shaped as shown in Figures 2 and 3 so that the opening flares outwardly on each side from approximately the center of the ball end 52. Together, the guide bearings 58 and 60 and the slot 62 permit the selector lever 18 to be swivably manoeuvered to a series of settings under the control of a detent device viewed generally at 64.

As depicted in the Figure 2 embodiment, the detent device 64 is made up of a spring biased ball detent 66 fixedly positioned within a boss 68 formed on the ball end 52 diametrically opposite the threaded connection with the selector lever 18. An opening 70 is provided in the cover 46 for the boss 68 and thereby enables the ball detent 66 to be in contact with a depressed guide surface 72 in the detent plate 48. As best illustrated in Figure 6, the guide surface 72 is provided with a series of depressions 74 that conform to the contour of the ball detent 66. Each of the depressions 74 represents one of the settings for the selector lever 18, and these settings in sequence correspond to different transmission operating ranges, e.g., as designated by legends L, D, R, N, and P, displaced on a selector lever guide plate 76 attached to the selector lever side of the housing 30 and corresponding respectively to Low, Drive, Reverse, Neutral, and Park transmission statuses. With reference particularly to Figure 4, it can be seen that the guide plate 76 is provided with a somewhat H-shaped guide slot 78 in which the selector lever 18 is manoeuvered, thereby establishing a pattern very similar to that utilized in operating the conventional shifting gear type transmission.

To summarize the mode of operating the control mechanism 10 and further explain the details and features thereof, reference is made to Figure 3 where the different settings of the selector lever 18 and the output lever 20 are displayed either in broken lines or solid lines. Assuming, also, that the selector lever is in the Park setting, then the output lever 20 will be in the uppermost position thereof and the ball detent 66 will be in the corresponding depression 74 in the detent plate guide surface 72. The detent device 64 will afford the driver with a distinct feel of this setting in each of the other settings and in addition aids in insuring that the selector lever 18 is in the setting selected, for the ball detent 66 will tend to seek the chosen setting depression 74 when in closed vicinity thereof. Now, manoeuvering the lever 18 upwardly, the next setting will be the Neutral setting and the ball detent 66 will engage the central one of the depressions 74. Next, the selector lever 18 is moved downwardly to the Reverse setting and the detent device 64 will become again effective. Successively, then the selector lever 18 can be moved to the Drive setting, returned to Neutral, and then moved to the Low setting. During this sequence of movements, the selector lever 18 is, as can be seen, swiveling about the axis defined by the coaction between the guide bearings 58 and 60 and the ball end 52 of the selector lever 18. However, the movement of the output lever 20 is a rotary one about the axis of the shaft 36 and is progressive. To explain this further, note in Figure 3 that in proceeding progressively through the Park, Reverse, Neutral, Drive, and Low settings, the output lever 20 revolves an angular amount determined by the guide plate pattern with relative rotation between one direction. In fact, depending on the requirements of the installation, the angular distances between each position of the output lever 20 may be made equal if desired.

In effect, then, the arrangement permits easy manoeuvering of a selector lever 18 in several planes due to the swivel mounting of the selector lever 18 but the output movement is confined to motion in one plane, namely, rotary, with each setting being a predetermined distance apart. In going from Park to Low in the Figure 1 embodiment, the cable is under compression due to the push action. In moving from Low to Park, the cable 22 is under tension and there is a pull exerted on the transmission external control lever 26. These, of course, can be changed. Also, the leverage can be varied by changing the length of the output lever 20 and the selector lever 18 as required by the particular installation.

A modification of the control mechanism 10 just described, is shown by Figures 7 and 8. This modified control mechanism is denoted by the numeral 10′, and like parts thereof are assigned the same numerals as the control mechanism 10.

Referring first to Figure 7, a revised output lever 80 is formed somewhat in a U-shape with spaced legs 82 and 84 revolvably joined to the housing 30 by shaft 36. Connection is made with the cable 22 by a clevis or the equivalent at 86. Carried by the legs 82 and 84 and positioned substantially parallel to the shaft 36, is a cross shaft 88. Cross shaft 88 is embraced by a bifurcated end 90 formed integral or otherwise attached to a ball end 92 of the selector lever 18. When the selector lever 18 is swiveled in the foregoing discussed manner, then, as can be seen, the bifurcated end 90 will move along cross shaft 88 to the broken line positions depicted and revolve output lever 80 to corresponding positions.

Maintenance of these settings with the Figure 7 embodiment is established by a detent device 94 best shown in Figures 8 and 9. This detent device 94 comprises a spring biased ball 96 positioned within one or both of the housing flanges 98 and 100, situated approximately ninety degrees from each of the flanges 32 and 34. These ball detents 96 engage guide tracks 102 formed in the periphery of the ball end 92 and each setting of the lever 18 is defined by ball-like depressions 104 situated along the guide track 102 so as to afford the same pattern of movement for the selector lever 18 as in the control mechanism 10. The operation of this control mechanism 10′ is the same as before described with respect to the control mechanism 10.

As can be seen, the control mechanism is very simple in construction so as to be especially suited for mass production techniques, it being possible to make many of the parts of inexpensive stampings. Also, the selector lever 18 is easily manoeuvered, friction being very low due to the small areas subjected to relative rubbing movement, and all movements are in a pattern that is well known to vehicle drivers; therefore, the simplicity eliminates the need for any special instructions as to operation. By installing the control mechanism on the instrument panel, accessibility is enhanced, and adequate leverage is easily obtainable despite space restrictions thereby permitting the use of a cable. Moreover, the detent is installed on the manual side of the cable 22 so that slack in the cable 12 will not interfere with the proper establishment of a selected setting.

The invention is to be limited only by the following claims:

1. In a control mechanism, the combination of a housing, a selector member swivably mounted in the housing for movement to a plurality of settings, an output member rotatable by the selector member to positions corresponding to each of the plurality of selector member settings, a guide track having stops corresponding to each of the plurality of settings, and detent means coacting with the guide track and the selector member so as to both guide the selector member to different ones of the plurality of settings determined by the stops and releasably retain the selector member in each of the plurality of settings.

2. In a control mechanism, the combination of a housing, a selector member swivably mounted in the housing for movement to a plurality of settings, an output member rotatable by the selector member to positions corresponding to each of the plurality of selector member settings, a guide track having stops corresponding to each of the plurality of settings, and detent means coacting with the selector member and the guide track so as to establish each of the plurality of selector member settings, the detent means being so arranged that when the selector member is swiveled progressively to each of the plurality of settings determined by the stops commencing with one extreme setting and ending with another extreme setting the selector member is guided by the detent means in a predetermined pattern established by the guide track thereby causing the output member to be progressively revolved in one relative direction in proportionate amounts.

3. In a control mechanism, the combination of a housing, a selector member swivably mounted in the housing for movement to a plurality of settings, an output member rotatable by the selector member to positions corresponding to each of the plurality of selector member settings, and a guide track conforming to the predetermined pattern and having stops corresponding to each of the plurality of settings, detent means coacting with the selector member and the guide track so as to establish each of the plurality of selector member settings, and a guide member cooperating with the selector member to define a predetermined pattern of movement for the selector member, the detent means being so arranged that when the selector member is swiveled progressively to each of the plurality of settings determined by the stops commencing with one extreme setting and ending with another extreme setting the selector member is guided by the detent means in the predetermined pattern established by the guide track and causes the output member to be progressively revolved in one relative direction in proportionate amounts.

4. In a control mechanism, the combination of a housing provided with a socket member, a selector member swivably supported by the socket member for movement to a plurality of settings, an output rotatable by the selector member to positions corresponding to each of the plurality of selector member settings, and detent means cooperating with the housing and the selector member to releasably establish each of the plurality of settings, the detent means including a detent element carried by one member and a guide track formed in the other member, the guide track having setting establishing portions thereof arranged so as to define each of the plurality of selector member settings and guide portions interconnecting the setting establishing portions thereby establishing a pattern of movement for the selector member when moved from one setting to another, the detent element being biased into engagement with the guide track so as to releasably detain the selector member in each of the portions thereof.

5. In a control mechanism, the combination of a housing provided with a socket member, a selector member swivably supported by the socket member for movement to a plurality of settings, an output member rotatable by the selector member to positions corresponding to each of the plurality of selector member settings, and detent means cooperating with the housing and the selector member to releasably establish each of the plurality of settings, the detent means including a detent element carried by the selector member and a guide track formed in the housing, the guide track having setting establishing portions thereof arranged so as to define each of the plurality of selector member settings and guide portions interconnecting the setting establishing portions thereby establishing a predetermined pattern of movement for the selector member when moved from one setting to another, the detent element being biased into engagement with the guide track so as to releasably detain the selector member in each of the portions thereof.

6. In a control mechanism, the combination of a housing provided with a socket receptacle, a shaft supported by the housing, a selector member having a ball portion received by the socket receptacle so as to be swivable to a plurality of settings and an elongated slot extending therethrough for receiving the shaft, an output member revolvably supported on the shaft and drive connected to the selector member, and detent means cooperating with the housing and the selector member to releasably establish each of the plurality of selector member settings, the detent means including a detent element carried by the ball portion of the selector member and a guide track formed in the housing adjacent the detent element, the guide track having portions thereof arranged so as to establish a predetermined pattern of movement for the selector member, the detent element being biased into engagement with the guide track so as to releasably detain the selector element in each of the portions thereof.

7. In a control mechanism, the combination of a housing provided with a socket receptacle, a shaft supported by the housing, a selector member having a ball portion received by the socket, and an elongated slot extending therethrough and receiving the shaft, the slot area increasing in each direction from the center of the ball portion, the selector member being swivable to a plurality of settings, an output lever revolvably supported on the shaft and drive connected to the selector member, detent means cooperating with the housing and the selector member to releasably establish each of the plurality of selector member settings, and a guide plate coacting with the selector member to define a predetermined pattern of movement for the selector member, the detent means including a detent element carried by the ball portion of the selector element and a guide track formed in the housing adjacent the detent element, the guide track having portions thereof arranged so that the selector member follows the predetermined pattern of movement, the detent element being biased into engagement with the guide track so as to releasably detain the selector member in each of the portions thereof.

8. In a control mechanism for a vehicle transmission of a character that is positioned on a vehicle instrument panel, the combination of a housing mounted on the instrument panel and provided with a socket receptacle, a shaft supported by the housing, a selector member having a ball portion received by the socket so as to be swivable to a plurality of transmission settings and an elongated slot extending through the ball portion for receiving the shaft, the slot area increasing from the center of the ball portion, an output arm revolvably supported by the shaft and having a portion thereof connected to the selector lever so as to provide a direct connection therebetween, and detent means for releasably establishing each of the plurality of settings, the detent means including a detent element carried by the ball portion of the selector lever, and a guide track formed in the housing adjacent the detent element, the guide track having depressed portions arranged to define a predetermined pattern of movement for the selector lever, the detent element being biased into engagement with the guide track so as to releasably detain the selector element in each of the depressed portions, the selector lever when swiveled to each of the plurality of settings commencing with one extreme setting and ending with another extreme setting causes the output member to be revolved in one relative direction in proportionate amounts.

9. In a control mechanism, the combination of a housing provided with a socket member, a selector member swivably supported by the socket member for movement to a plurality of settings, an output member rotatable by the selector member to positions corresponding to each of the plurality of selector member settings, and detent means cooperating with the housing and the selector member to releasably establish each of the plurality of settings, the detent means including a detent element carried by the socket member and a guide track formed in the selector member, the guide track having portions thereof arranged so as to define each of the plurality of selector member settings thereby establishing a predetermined pattern of movement for the selector member, the detent element being biased into engagement with the guide track so as to releasably detain the selector member in each of the portions thereof.

10. In a control mechanism, the combination of a housing provided with a socket receptacle, a shaft supported by the housing, a selector member having a ball portion received by the socket and an elongated slot extending therethrough for receiving the shaft, the selector member being swivable to a plurality of settings and having a bifurcated portion, an output member revolvably supported on the shaft, the output member including a cross shaft embraced by the bifurcated portion of the selector member so as to afford a drive connection therebetween, and detent means cooperating with the selector member to releasably establish each of the plurality of settings, the detent means including a detent element carried by the socket receptacle and a guide track formed in the periphery of the ball portion of the selector member, the guide track having portions thereof arranged so as to define a predetermined pattern of movement for the selector member, the detent element being biased into engagement with the guide track so as to releasably detain the selector element in each of the portions thereof.

11. In a control mechanism, the combination of a housing provided with a socket receptacle, a shaft supported by the housing, a selector member having a ball portion received by the socket receptacle and an elongated slot extending through the ball portion for receiving the shaft, the slot area increasing from the center of the ball portion, the selector member being swivable to a plurality of settings and having a bifurcated portion, an output member revolvably supported on the shaft, the output member including a cross shaft embraced by the bifurcated portion of the selector member so as to afford a drive connection therebetween, detent means cooperating with the selector member to releasably establish each of the plurality of settings, and a guide plate coacting with the selector member to define a predetermined pattern of movement for the selector member, the detent means including a detent element carried by the socket receptacle and a guide track formed in the periphery of the ball portion of the selector member, the guide track having portions thereof arranged so that the selector member follows the predetermined pattern of movement, the detent element being biased into engagement with the guide track so as to releasably detain the selector element in each of the portions thereof.

12. In a control mechanism for a vehicle transmission of a character that is positioned on a vehicle instrument panel, the combination of a housing provided with a socket receptacle, a shaft supported by the housing, a selector lever having a ball portion received by the socket receptacle so as to be swivable to a plurality of settings, a bifurcated portion, and an elongated slot extending through the ball portion for receiving the shaft, the slot area increasing outwardly from the center of the ball, an output member revolvably supported on the shaft and having thereon a cross shaft embraced by the bifurcated portion of the selector lever so as to provide a drive connection therebetween, and detent means for releasably establishing each of the plurality of selector lever settings, the detent means including a detent element carried by the socket receptacle and a guide track formed in the periphery of the selector lever ball portion, the guide track having depressions therealong arranged so as to define a predetermined pattern of movement for the selector element, the detent element being biased into engagement with the guide track so as to releasably detain the selector lever in each of the depressed portions thereof, the selector lever when swiveled to each of the plurality of settings commencing with one extreme setting and ending with another extreme setting causes the output member to be revolved in one relative direction in proportionate amounts.

References Cited in the file of this patent

UNITED STATES PATENTS

| 2,315,877 | Snyder | Apr. 6, 1943 |

FOREIGN PATENTS

| 140,316 | Austria | Jan. 25, 1935 |
| 143,580 | Australia | Sept. 26, 1951 |
| 416,567 | Germany | Sept. 10, 1934 |
| 734,540 | Germany | Apr. 19, 1943 |